US008216656B2

(12) United States Patent
Matsubara et al.

(10) Patent No.: US 8,216,656 B2
(45) Date of Patent: Jul. 10, 2012

(54) DISC MASTER, DISC MASTER MANUFACTURING METHOD, STAMPER, DISC SUBSTRATE, OPTICAL DISC, AND OPTICAL DISC MANUFACTURING METHOD

(75) Inventors: Takashi Matsubara, Shizuoka (JP); Yoshitake Yanagisawa, Shizuoka (JP)

(73) Assignee: Sony Corporation, Tokyo (JP)

( * ) Notice: Subject to any disclaimer, the term of this patent is extended or adjusted under 35 U.S.C. 154(b) by 441 days.

(21) Appl. No.: 12/524,871

(22) PCT Filed: Nov. 7, 2008

(86) PCT No.: PCT/JP2008/070316
§ 371 (c)(1),
(2), (4) Date: Jul. 29, 2009

(87) PCT Pub. No.: WO2009/084326
PCT Pub. Date: Jul. 9, 2009

(65) Prior Publication Data
US 2010/0035012 A1    Feb. 11, 2010

(30) Foreign Application Priority Data
Dec. 27, 2007   (JP) ................................. 2007-336230

(51) Int. Cl.
*B32B 3/02* (2006.01)
(52) U.S. Cl. .................. 428/64.1; 428/64.4; 430/270.11
(58) Field of Classification Search .............. 428/64.4; 430/270.11
See application file for complete search history.

(56) References Cited

U.S. PATENT DOCUMENTS

| 4,839,208 | A | 6/1989 | Nakagawa et al. |
| 5,304,455 | A | 4/1994 | Van Liempd |
| 5,741,627 | A | 4/1998 | Cubit et al. |
| 5,781,526 | A | 7/1998 | Nishizawa et al. |
| 6,022,604 | A | 2/2000 | Del Mar et al. |
| 6,570,840 | B1 * | 5/2003 | Wilkinson et al. ......... 369/275.4 |
| 7,251,211 | B2 * | 7/2007 | Endoh ........................ 369/275.4 |
| 2003/0193875 | A1 | 10/2003 | Rilum et al. |
| 2005/0226999 | A1 | 10/2005 | Kouchiyama et al. |

(Continued)

FOREIGN PATENT DOCUMENTS
EP    0 488 451 A1   6/1992
(Continued)

OTHER PUBLICATIONS

Communication pursuant to Article 94(3) EPC issued Nov. 21, 2011, in European Patent Application No. 08 868 467.5.

(Continued)

*Primary Examiner* — Elizabeth Mulvaney
(74) *Attorney, Agent, or Firm* — Oblon, Spivak, McClelland, Maier & Neustadt, L.L.P.

(57) ABSTRACT

In a process of manufacturing a disc master, a stamper, a disc substrate, and an optical disc, separation performance between the stamper and the disc substrate and maintenance of satisfactory signal characteristics after the optical disc is manufactured are taken into consideration in the step of manufacturing the disc master. In the disc master, a boundary portion between a recessed portion and a non-recessed portion includes a small protrusion which protrudes from a flat surface of the non-recessed portion. The shape of the disc master is inversely transferred to the stamper, and the shape of the stamper is inversely transferred to the disc substrate. The separation performance is improved and the signal characteristics are maintained due to the shape of the boundary portion.

8 Claims, 10 Drawing Sheets

SHAPE OF SUBSTRATE (THERMOCHEMICAL REACTION)

U.S. PATENT DOCUMENTS

2005/0281176 A1 * 12/2005 Lai ............................ 369/272.1

FOREIGN PATENT DOCUMENTS

| | | |
|---|---|---|
| EP | 1 477 847 A1 | 11/2004 |
| JP | 58-169355 | 10/1983 |
| JP | 62 256691 | 11/1987 |
| JP | 1 271934 | 10/1989 |
| JP | 2 48988 | 2/1990 |
| JP | 4 313829 | 11/1992 |
| JP | 2001 202659 | 7/2001 |
| JP | 2004 152465 | 5/2004 |
| JP | 2006 65942 | 3/2006 |
| JP | 2006 179140 | 7/2006 |
| JP | 2006 309908 | 11/2006 |
| JP | 2007 305247 | 11/2007 |

OTHER PUBLICATIONS

Supplementary European Search Report issued Oct. 21, 2011, in European Patent Application No. 08868467.5.

* cited by examiner (a) FILM FORMING (b) EXPOSURE (c) DEVELOPING (d) ELECTROFORMING (e) SEPARATION (a) STAMPER (b) SUBSTRATE MOLDING (c) DISC SUBSTRATE (d) REFLECTIVE FILM FORMING (e) COVER LAYER FORMING (a) EXPOSURE WITH THERMOCHEMICAL REACTION (b) MASTER SURFACE AFTER DEVELOPMENT WITH THERMOCHEMICAL REACTION (c) THERMOCHEMICAL REACTION STAMPER (a) RESIN TRANSFER MOLDING USING THERMOCHEMICAL REACTION STAMPER (AFTER INJECTION)

(b) RESIN TRANSFER MOLDING USING THERMOCHEMICAL REACTION STAMPER (AFTER COOLING)

(c) SHAPE OF SUBSTRATE AFTER SEPARATION (THERMOCHEMICAL REACTION)

(a) EXPOSURE WITH OPTICAL REACTION (b) MASTER SURFACE AFTER DEVELOPMENT WITH OPTICAL REACTION (c) OPTICAL REACTION STAMPER (a) RESIN TRANSFER MOLDING USING OPTICAL REACTION STAMPER (AFTER INJECTION)

(b) RESIN TRANSFER MOLDING USING OPTICAL REACTION STAMPER (AFTER COOLING)

(c) SHAPE OF SUBSTRATE AFTER SEPARATION (OPTICAL REACTION)

DISC MASTER, DISC MASTER MANUFACTURING METHOD, STAMPER, DISC SUBSTRATE, OPTICAL DISC, AND OPTICAL DISC MANUFACTURING METHOD

TECHNICAL FIELD

The present invention relates to a disc master, a disc master manufacturing method, a stamper, a disc substrate, an optical disc, and an optical disc manufacturing method.

BACKGROUND ART

Patent Document 1: Japanese Unexamined Patent Application Publication No. 2004-152465
Patent Document 2: Japanese Unexamined Patent Application Publication No. 2-150325

Conventionally, in a general optical disc manufacturing method, first, a disc master is manufactured. Then, a stamper is manufactured using the disc master, and disc substrates are mass-produced using the stamper. A layered structure including a reflective film, a cover layer, etc., is formed on the mass-produced disc substrates. Thus, optical discs are completed.

Here, first, the disc master is formed such that the disc master has a recess-projection pattern for forming a pit/land structure which defines information signal lines, or a recess-projection pattern for forming a groove/land structure which defines recording tracks. Then, a stamper is formed in which the recess-projection pattern is transferred in an inverted manner. Then, disc substrates having a recess-projection pattern obtained by transferring the recess-projection pattern on the stamper in an inverted manner are manufactured.

A part of a manufacturing process for manufacturing, for example, a reproduction-only optical disc having embossed pit rows defined by a pit/land structure will be described with reference to FIGS. 8 and 9.

FIG. 8(a) illustrates the manner in which a photoresist (organic resist) film formed on a master substrate made of, for example, glass, is subjected to an exposure step.

In the process of forming a disc master, a resist film 102 is formed on the master substrate, and the resist film 102 is irradiated with a laser beam L. The laser beam L is modulated on the basis of information signals to be recorded in the form of pit rows.

As shown in FIG. 8(a), portions of the resist film 102 which are subjected to the laser irradiation are formed into exposed portions 102a by optical reaction. In other words, the exposed portions 102a and unexposed portions 102b are formed as a result of the laser irradiation.

After the above-described exposure step, development is performed in a development step. As a result, as shown in FIG. 8(b), the exposed portions 102a are formed into recessed portions 110 and the unexposed portions 102b are formed into projecting portions 111. Thus, a disc master having a physical recess-projection pattern is completed. In other words, the disc master is manufactured by subjecting the organic resist to exposure with optical reaction and then developing the organic resist.

Here, in the disc master obtained by the exposure with optical reaction, boundaries between the recessed and projecting portions are generally substantially vertical. In FIGS. 8(a) and 8(b), the boundaries between the recessed and projecting portions are inclined. The boundaries having the shapes shown in the figures can be formed by the following method. That is, when the development of the disc master is performed, diffracted light (0 order light and 1st order light) is observed on a development monitor and the development is stopped in the state in which an optimum signal can be obtained instead of performing the development to the end. In this case, a higher separation performance can be obtained compared to the case in which the boundaries are closer to vertical. The development using the development monitor is commonly performed in the optical reaction method.

Next, a stamper 104 shown in FIG. 8(c) is manufactured using the above-described disc master. The stamper 104 has a recess-projection pattern obtained by transferring the recess-projection pattern on the disc master in an inverted manner. More specifically, portions corresponding to the recessed portions 110 in the disc master are formed as projecting portions 120 and portions corresponding to the projecting portions 111 in the disc master are formed as recessed portions 121.

Disc substrates are mass-produced by injection molding using the above-described stamper 104.

FIG. 9(a) shows the state in which resin (for example, polycarbonate) for forming a disc substrate 105 is injected into a mold in which the stamper 104 is placed.

FIG. 9(b) shows the state in which the resin injected into the mold is cooled.

FIG. 9(c) shows the state in which the stamper 104 is removed after the resin is cooled. Thus, as shown in the figure, the disc substrate 105 in which the recess-projection pattern on the stamper 104 is transferred in an inverted manner is obtained. In the disc substrate 105, portions corresponding to the recessed portions 121 in the stamper are formed as projecting portions (lands) 131 and portions corresponding to the projecting portions 120 in the stamper are formed as recessed portions (pits) 130.

DISCLOSURE OF INVENTION

In the disc substrate 105 produced by injection molding using the stamper 104 as described above, when the recess-projection pattern is formed, portions with a small radius of curvature are formed in regions (hereinafter referred to as "recess-projection boundaries") where the shape changes from the recessed portions 130 to the projecting portions 131 or from the projecting portions 131 to the recessed portions 130. In these regions, high residual stress remains.

Therefore, to ensure the shape-maintaining characteristics (hereinafter referred to as "transferability") of the pits in the disc substrate 105 after the disc substrate 105 is separated from the stamper 104, sufficient cooling and pressurization must be performed to release the residual stress.

However, when sufficient cooling and pressurization are performed to improve the transferability, there is a problem that adhesion between the substrate and the stamper increases and the separation performance will be degraded.

Various methods for improving the separation performance by, for example, selecting a material which can be easily separated from the stamper 104 as a material of the disc substrate 105, changing the molding conditions of the disc substrate 105, changing the shape of the mold for holding the stamper 104, subjecting the stamper 104 to a surface treatment for improving the separation performance, mixing a releasing agent into the material for forming the substrate, or changing the overall shape of the stamper 104, have been proposed and tested.

However, these methods are disadvantageous in that signal characteristics or physical characteristics will be degraded or in that the manufacturing steps are complex, and the stable separation performance of the stamper 104 cannot be obtained.

As another method, the shapes of portions with a small radius of curvature (for example, edges of pits) at the recess-projection boundaries have been changed into a softer shape to increase the radius of curvature.

For example, in FIG. 9(b), the radius of curvature is increased by utilizing the fact that the edges at the recess-projection boundaries are rounded due to curing contraction of the material for forming the disc substrate 105 when the material is pressurized and cooled. As shown in FIG. 9(c), regions in which the projecting portions 131 continue to the recessed portions 130 are formed in a curved shape.

In this case, the effect of reduction in the contact area between the stamper 104 and the disc substrate 105 is additionally obtained and stable separation performance can be provided.

However, the difference at the recess-projection boundaries, that is, pit/land boundaries, in the disc substrate 105 becomes unclear. This leads to another problem that signal characteristics will be degraded when signals are read from the optical disc.

FIG. 10 is an enlarged view illustrating the recess-projection pattern on the disc substrate 105 obtained when the radius of curvature is increased.

In the disc substrate 105, the recessed portions 130 serve as pits and the projecting portions (non-recessed portions) 131 serve as lands. As shown in the figure, recess-projection boundaries 132 between the recessed portions 130 and the projecting portions 131 have a curved shape with a relatively large radius of curvature.

Here, the ideal shape of the contour of the recess-projection boundaries 132 in consideration of the reproduction signal characteristics is the shape shown by the dashed line (M). However, since the recess-projection boundaries 132 are curved, there are areas A and B where the actual contour differs from the ideal contour M. In the area A, the actual contour differs from the ideal contour of the land portion. In the area B, the actual contour differs from the ideal inclined pit portion.

In this case, in a portion corresponding to the area A, the position of the pit/land boundary in the area A is unclear. Therefore, when the optical disc is completed and is subjected to a reproduction process, the pit/land boundary cannot be clearly detected in the reproduction signal. As a result, degradation of the signal characteristics, such as increase of jitter in the reproduction signal, will occur.

In view of the above-described problems, an object of the present invention is to ensure the separation performance while maintaining the maintenance of the signal characteristics (suitable transferability) of the optical disc.

The present invention provides a disc master, a stamper, and a disc substrate used in a manufacturing process for manufacturing an optical disc, and the optical disc as a completed product. The manufacturing process includes the steps of manufacturing the stamper using the disc master, the disc master having a recessed portion formed therein, the stamper having a projecting portion formed by transferring the recessed portion; manufacturing the disc substrate using the stamper, the disc substrate having a recessed portion formed by transferring the projecting portion in the stamper; and forming a predetermined layered structure on the disc substrate. In addition, the present invention also provides a disc master manufacturing method and an optical disc manufacturing method which relate to the above-mentioned manufacturing process.

In the disc master according to the present invention, an exposed portion is formed by thermochemical reaction caused by exposing an inorganic resist film provided on a master substrate to a laser beam, a development process is performed so that the exposed portion is formed into the recessed portion, and a boundary portion between the recessed portion and a non-recessed portion includes a small protrusion which protrudes from a flat surface of the non-recessed portion.

In addition, a height of the small protrusion from the flat surface of the non-recessed portion is in the range of 3% to 10% of a height of the flat surface of the non-recessed portion from the recessed portion, and a radius of curvature of the small protrusion is in the range of 20% to 60% of the height of the flat surface of the non-recessed portion from the recessed portion.

The disc master manufacturing method according to the present invention includes a film forming step of forming an inorganic resist film on a master substrate; an exposure step of forming an exposed portion by thermochemical reaction by exposing the inorganic resist film on the master substrate to a laser beam; and a deposition step of performing a deposition process for the master substrate on which the exposed portion is formed for a predetermined time, so that the exposed portion is formed into the recessed portion and a small protrusion which protrudes from a flat surface of a non-recessed portion is formed in a boundary portion between the recessed portion and the non-recessed portion.

In this case, an inorganic resist material for forming the inorganic resist film, power of the laser beam, and the time for which the development process is performed are set such that a height of the small protrusion from the flat surface of the non-recessed portion is in the range of 3% to 10% of a height of the flat surface of the non-recessed portion from the recessed portion and a radius of curvature of the small protrusion is in the range of 20% to 60% of the height of the flat surface of the non-recessed portion from the recessed portion.

In the stamper according to the present invention, a boundary portion between the projecting portion and a non-projecting portion includes a small depression which is formed in a bottom surface of the non-projecting portion.

In the disc substrate according to the present invention, a boundary portion between the recessed portion and a non-recessed portion includes a small protrusion which protrudes from a flat surface of the non-recessed portion.

In this case, a height of the small protrusion from the flat surface of the non-recessed portion is in the range of 3% to 10% of a height of the flat surface of the non-recessed portion from the recessed portion, and a radius of curvature of the small protrusion is in the range of 20% to 60% of the height of the flat surface of the non-recessed portion from the recessed portion.

In the optical disc according to the present invention, a boundary portion between the recessed portion and a non-recessed portion formed in the disc substrate includes a small protrusion which protrudes from a flat surface of the non-recessed portion.

In addition, a height of the small protrusion from the flat surface of the non-recessed portion is in the range of 3% to 10% of a height of the flat surface of the non-recessed portion from the recessed portion, and a radius of curvature of the small protrusion is in the range of 20% to 60% of the height of the flat surface of the non-recessed portion from the recessed portion.

The optical disc manufacturing method according to the present invention includes a film forming step of forming an inorganic resist film on a master substrate; an exposure step of forming an exposed portion by thermochemical reaction by exposing the inorganic resist film on the master substrate to a laser beam; a deposition step of forming a disc master by performing a deposition process for the master substrate on which the exposed portion is formed for a predetermined time so that the exposed portion is formed into the recessed portion and a small protrusion which protrudes from a flat surface of a non-recessed portion is formed in a boundary portion between the recessed portion and the non-recessed portion; a stamper forming step of forming a stamper using the disc master, the stamper having a projecting portion formed by transferring the recessed portion in the disc master; a substrate forming step of forming a disc substrate using the stamper, the disc substrate having a recessed portion formed by transferring the projecting portion in the stamper; and a layered-structure forming step of forming an optical disc by forming a predetermined layered structure on the disc.

In addition, in the disc substrate according to the present invention, the disc substrate has a recessed portion formed by transferring the projecting portion in the stamper, and the stamper used for manufacturing the disc substrate is a stamper in which a boundary portion between the projecting portion and a non-projecting portion includes a small depression which is formed in a bottom surface of the non-projecting portion.

In addition, in the optical disc according to the present invention, the stamper used for manufacturing the disc substrate is a stamper in which a boundary portion between the projecting portion and a non-projecting portion includes a small depression which is formed in a bottom surface of the non-projecting portion, and the predetermined layered structure is formed on the disc substrate.

According to the above-described present invention, in a process of manufacturing a disc master, a stamper, a disc substrate, and an optical disc, separation performance between the stamper and the disc substrate and maintenance of satisfactory signal characteristics after the optical disc is manufactured are taken into consideration in the step of manufacturing the disc master.

More specifically, in the disc master, a boundary portion between a recessed portion and a non-recessed portion includes a small protrusion which protrudes from a flat surface of the non-recessed portion. The shape of the disc master is inversely transferred to the stamper, and the shape of the stamper is inversely transferred to the disc substrate. The separation performance is improved and the signal characteristics are maintained due to the shape of the boundary portion.

According to the present invention, in the process of manufacturing the optical disc, the separation performance between the stamper and the disc substrate can be improved. In addition, satisfactory signal characteristics can be maintained in the manufactured optical disc.

BEST MODE FOR CARRYING OUT THE INVENTION

Hereinafter, an embodiment of the present invention will be described.

Figure 1:
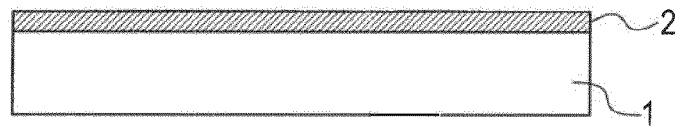
FIG. 1 is a diagram illustrating manufacturing steps according to an embodiment of the present invention.
Figure 1:
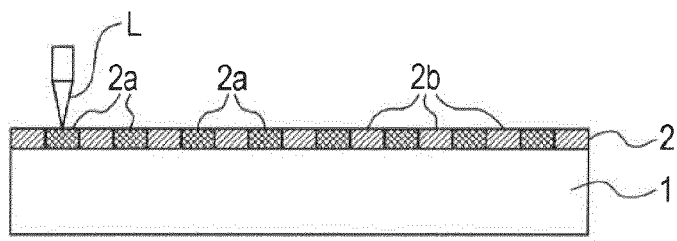
Figure 1:
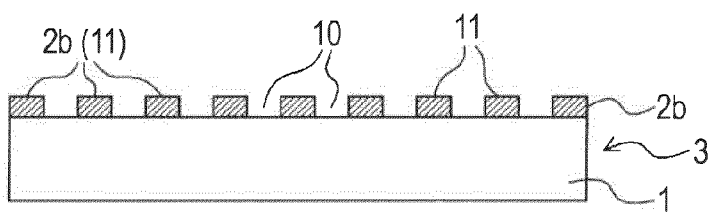
Figure 1:
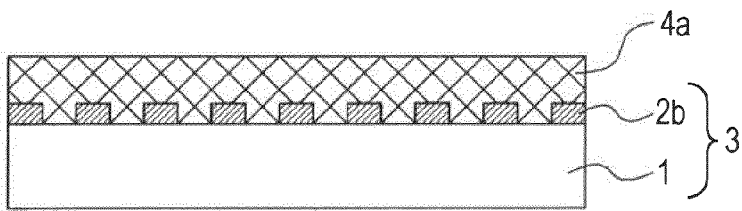
Figure 1:
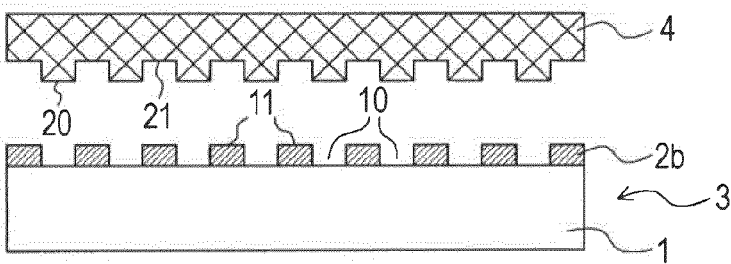
Figure 2:
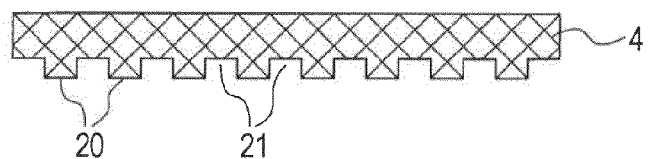
FIG. 2 is a diagram illustrating manufacturing steps according to the embodiment.
Figure 2:
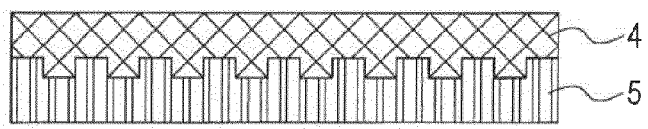
Figure 2:
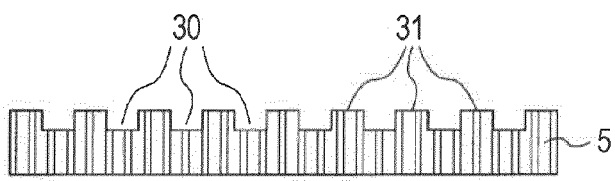
Figure 2:
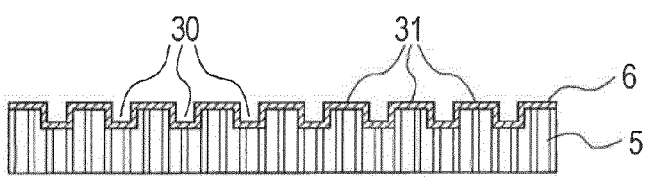
Figure 2:
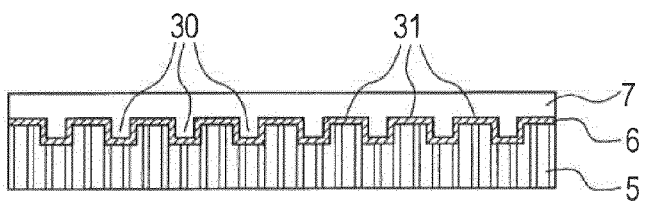

First, the overall manufacturing process of an optical disc will be described with reference to FIGS. 1 and 2.

FIG. 1(a) shows the state in which a resist film 2 is formed on a master substrate 1 for forming a disc master.

The master substrate 1 is, for example, a glass substrate or a silicon wafer substrate.

In the film forming step, the resist layer 2 made of an inorganic resist material is uniformly formed on the master substrate 1 by sputtering.

More specifically, a film of inorganic resist is formed using a film-forming device (sputtering device) on the master substrate 1 made of glass or silicon wafer. Thus, a film with a sufficient thickness for forming pits or grooves with a desired height is obtained.

In the sputtering device, an alloy oxide of a transition metal, for example, is used as a target material. With regard to a film-forming method, DC or RF sputtering is used.

In this example, in a mastering process for forming the disc master, PTM mastering using an inorganic resist material is performed. In this case, an incomplete oxide of a transition metal is used as a material for forming the resist layer 2. Examples of transition metals, which will be described below, include Ti, V, Cr, Mn, Fe, Nb, Cu, Ni, Co, Mo, Ta, W, Zr, Ru, and Ag.

Next, in an exposure step, as shown in FIG. 1(b), an exposure laser beam L is emitted using a mastering device and the resist layer 2 is selectively irradiated with the exposure laser beam L in accordance with pit rows or grooves corresponding to a signal pattern.

In this case, recording information is prepared in advance and is stored in a signal transmitter (formatter). Then, the laser beam L is modulated by a signal output from the signal transmitter, so that the exposure process can be performed in accordance with, for example, the pit rows. In the case where, for example, a Blu-ray Disc (Blu-ray Disc®) is manufactured, a blue laser diode with a wavelength of 405 nm is used as a source of the exposure laser beam L.

In the exposure step, portions irradiated with the exposure laser beam L are formed into exposed portions 2a by thermochemical reaction. Thus, the exposed portions 2a and unexposed portions 2b are formed.

Next, in a development step, the resist layer 2 is developed (etched) so that a disc master 3 having a predetermined recess-projection pattern (pit rows or grooves) is produced.

In this case, after the above-described exposure step, the development step is performed by a development device using alkaline fluid to obtain the disc master.

A developing method may be, for example, a dipping method including an immersing step or a method in which a chemical is applied to a base while the base is rotated by a spinner. With regard to the developer, for example, an organic alkaline developer containing TMAH (tetramethylammonium hydroxide) as a main component or an inorganic alkaline developer, such as KOH, NaOH, a phosphoric-acid-based developer, etc., may be used.

In the disc master 3, as shown in FIG. 1(c), the exposed portions 2a are formed into recessed portions 10 and the unexposed portions 102b are formed into projecting portions (non-recessed portions) 11. Thus, the disc master 3 having a physical recess-projection pattern is completed. In other words, the disc master 3 is manufactured by subjecting the inorganic resist to exposure with thermochemical reaction and then developing the inorganic resist.

Next, in an electroforming step, a stamper 4 is manufactured using the above-described disc master 3.

After the above-described development step, the disc master 3 is washed with water. Then, a metal nickel film 4a is deposited on a surface of the disc master 3 having the recess-projection pattern in an electroforming bath, as shown in FIG. 1(d).

After the electroforming step, the master obtained by the development step and the metal master are separated from each other (FIG. 1(e)).

Then, after the disc master 3 is removed, a predetermined process is performed so that the stamper 4 in which the recess-projection pattern on the disc master 3 is transferred and which is used for forming substrates is obtained.

The stamper 4 has a recess-projection pattern obtained by transferring the recess-projection pattern on the disc master 3 in an inverted manner. More specifically, portions corresponding to the recessed portions 10 in the disc master 3 are formed as projecting portions 20 and portions corresponding to the projecting portions 11 in the disc master 3 are formed as recessed portions (non-projecting portions) 21.

Here, before the electroforming step, the surface of the master obtained by the development step may be subjected to a separation treatment to improve the separation performance. This process is performed as necessary.

Then, after the nickel stamper 4 is manufactured, the disc master 3 made of inorganic resist is stored after being washed with water and dried. A desired number of nickel stampers are repeatedly manufactured as necessary.

In addition, as necessary, the stamper 4 separated from the master obtained by the development step may be used as a master for forming a mother master having the same recess-projection pattern as that on the master obtained by the development step by newly performing the electroforming step and the separation step. Then, the thus-obtained mother master may be used as a new disc master 3 for manufacturing another stamper having the same recess-projection pattern as that on the stamper 4 by newly performing the electroforming step and the separation step.

The stamper 4 (FIG. 2(a)) manufactured by the steps shown in FIGS. 1(a) to 1(e) is used to form a resin disc substrate 5 made of, for example, polycarbonate, which is a thermoplastic resin, by injection molding or the like.

More specifically, resin is injected into a mold (not shown) while the stamper 4 is placed in the mold, and is then cured. Then, the resin is separated from the stamper 4. Thus, the disc substrate 5 is formed (FIGS. 2(b) and 2(c)).

As shown in FIG. 2(c), the thus-formed disc substrate 5 has a recess-projection pattern in which portions corresponding to the projecting portions 20 in the stamper 4 are formed as recessed portions 30 and portions corresponding to the recessed portions (non-projecting portions) 21 in the stamper 4 are formed as projecting portions 31. The recessed portions 30 serve as pits and projecting portions (non-recessed portions) 31 serve as lands.

Then, as shown in FIG. 2(d), the disc substrate 5 is subjected to a process for forming a reflective film 6 made of, for example, an Ag alloy on the surface of the disc substrate 5 having the recess-projection pattern by sputtering. Then, as shown in FIG. 2(e), a cover layer 7 is formed. The cover layer (light transmitting layer) 7 is formed by spreading, for example, ultraviolet curable resin by spin coating and then curing the resin by irradiating the resin with ultraviolet rays.

In the state shown in FIG. 2(e), the optical disc is completed.

Additionally, however, the surface of the cover layer 7 may be subjected to hard coating and a moisture barrier film may be formed on the surface at the opposite side.

In the above-described manufacturing process, the resist material of the resist layer 2 used for manufacturing the disc master 3 is an incomplete oxide of a transition metal, as described above.

Here, an incomplete oxide of a transition metal is defined as a compound in which the oxygen content is smaller than that in the stoichiometric composition which corresponds to the valency of the transition metal, that is, a compound in which the content of oxygen in the incomplete oxide of the transition metal is smaller than the oxygen content in the stoichiometric composition which corresponds to the valency of the transition metal.

For example, a chemical formula $MoO_3$ will be described as an example of an oxide of a transition metal. When the composition in the oxidation state of the chemical formula $MoO_3$ is expressed as $Mo_{1-x}O_x$, a complete oxide is obtained when x=0.75. In contrast, when x is in the range of $0 \leq x \leq 0.75$, the oxide is an incomplete oxide in which the oxygen content is smaller than that in the stoichiometric composition.

Here, with some transition metals, oxides with different valencies may be formed from a single element. In this case, an incomplete oxide of a transition metal is defined as a compound in which the actual oxygen content is smaller than that in the stoichiometric composition which corresponds to the possible valencies of the transition metal. For example, although the oxide of Mo is most stable when the valency is 3 ($MoO_3$) as described above, there is also a monovalent oxide (MoO). In this case, when the composition is expressed as $Mo_{1-x}O_x$, the oxide is an incomplete oxide in which the oxygen content is smaller than that in the stoichiometric composition when x is in the range of $0 \leq x \leq 0.5$. The valencies of transition metal oxides can be determined with a commercially available analyzer.

The above-described incomplete oxides of transition metals absorb ultraviolet rays or visible light, or change chemical characteristics thereof when irradiated with ultraviolet rays or visible light. As a result, although the resist is an inorganic resist, etching can be performed at different rates between the exposed and unexposed portions in the etching step. In other words, selectivity can be provided. In addition, in the resist material made of an incomplete oxide of a transition metal, the size of fine particles in the film material is small. Therefore, clear boundary patterns can be formed between the unexposed portions and the exposed portions, and the resolution can be improved.

The characteristics of the incomplete oxides of the transition metals as a resist material vary in accordance with the degree of oxidation. Therefore, a suitable degree of oxidation is selected. For example, an incomplete oxide of a transition metal in which the oxygen content is considerably smaller than that in the stoichiometric composition of a complete oxide is disadvantages in that, for example, large irradiation power is required in the exposure step or in that the development process takes a long time. Therefore, preferably, an incomplete oxide of a transition metal in which the oxygen content is only slightly smaller than that in the stoichiometric composition of a complete oxide is used.

As described above, examples of transition metals which form the resist material include Ti, V, Cr, Mn, Fe, Nb, Cu, Ni, Co, Mo, Ta, W, Zr, Ru, and Ag. Among the above-mentioned transition metals, Mo, W, Cr, Fe, and Nb are preferably used. In particular, Mo and W are preferable since a large chemical change occurs when they are irradiated with ultraviolet rays or visible light.

In the above-described disc master manufacturing process, a PTM (Phase Transition Mastering) method is used in this example. The PTM method will be briefly explained.

When, for example, a disc of a CD (Compact Disc) type or a DVD (Digital Versatile Disc) type is manufactured, first, a disc master to which photoresist is applied is prepared. Then, a laser beam is emitted from a light source, such as a gas laser, toward the disc master through a mastering device. Thus, an exposure pattern corresponding to pits is formed. In this case, the laser beam emitted from a laser source, which is a continuous-wave laser, is subjected to light-intensity modulation performed by an AOM (Acousto-Optical Modulator). The thus-obtained intensity-modulated laser beam is guided to the disc master by an optical system, and thus the disc master is exposed to the laser beam. More specifically, for example, an NRZ (Non Return to Zero) modulation signal, which is a pit modulation signal, is supplied to the AOM, and the laser beam is intensity-modulated by the AOM in accordance with the pit pattern. As a result, only the pit portions on the master are exposed to the laser beam.

Figure 3:
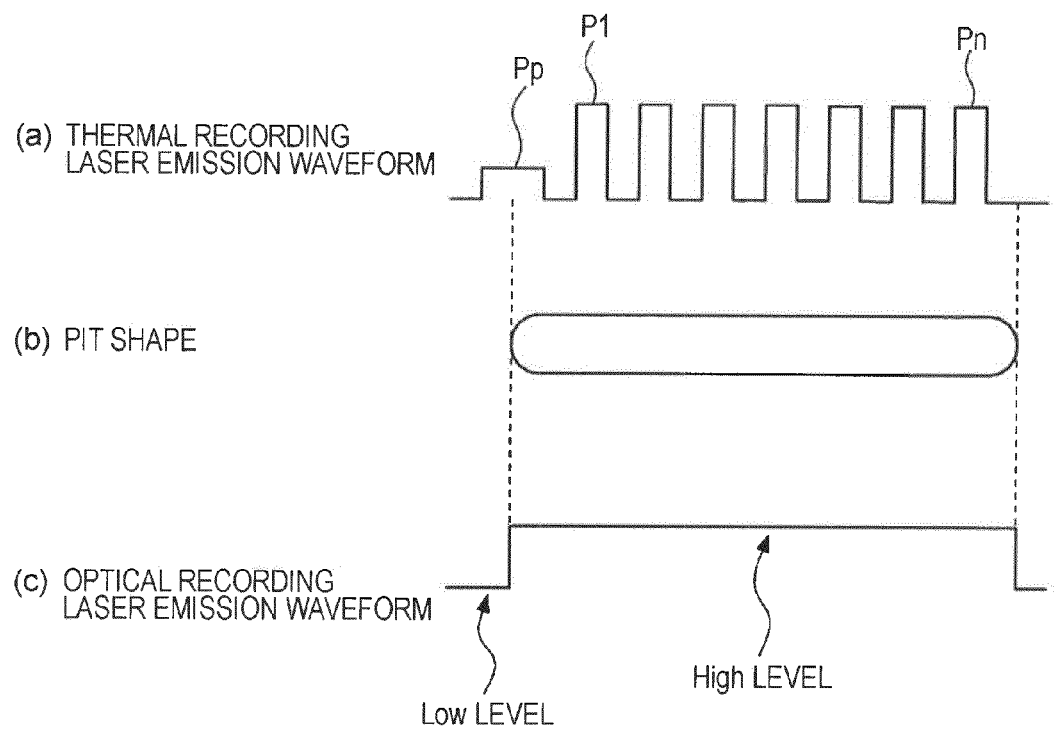
FIG. 3 is a diagram illustrating PTM.

For example, the shape of a single pit is shown in FIG. 3(b), and the laser emission intensity obtained as a result of the modulation performed by the AOM is shown in FIG. 3(c). The exposure process for exposing the photoresist on the master to the laser beam is an optical recording process. Therefore, the portion exposed to the laser beam shown in FIG. 3(c) directly serves as a pit.

In contrast, in the PTM method, the disc master on which the inorganic resist is applied is irradiated with a laser beam emitted from a semiconductor laser, and the exposure process is performed as a thermal recording process.

In this case, to suppress the accumulation of heat generated by the laser irradiation and obtain a uniform pit width, pulsed light shown in FIG. 3(a) is normally used in the exposure process. More specifically, in this case, an NRZ modulation signal which is synchronized with a clock is generally converted into a pulse signal having a time width that is smaller than the clock period in accordance with the length of a High level in the NRZ modulation signal. Then, electric power is supplied to a directly modulatable semiconductor laser in synchronization with a pulse modulation signal obtained as a result of the conversion. Thus, as shown in FIG. 3(a), laser emission corresponding to pre-heating pulsed light Pp and heating pulsed light P1 to Pn, which corresponds to the pit length, is performed.

Hereinafter, as a characteristic feature of the present embodiment, the recess-projection patterns on the disc master 3, the stamper 4, and the disc substrate 5 formed in the manufacturing steps shown in FIGS. 1 and 2 will be described. With regard to the above-mentioned components, mastering is suitably performed by the PTM method using thermochemical reaction of the inorganic resist.

Figure 4:
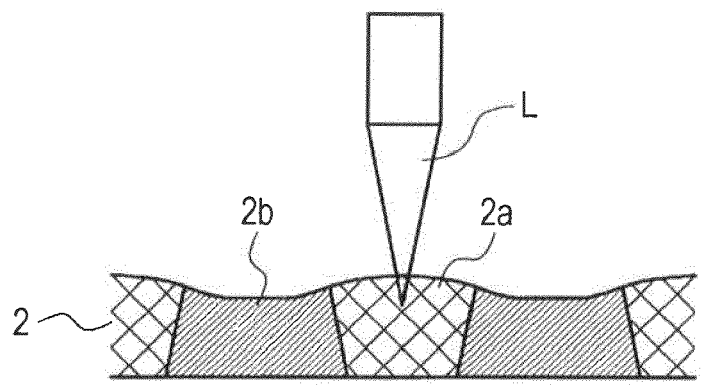
FIG. 4 is a diagram illustrating small protrusions on a disc master and small depressions in a stamper according to the embodiment.
Figure 4:
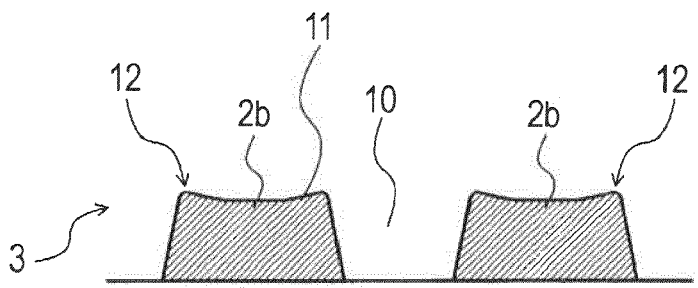
Figure 4:
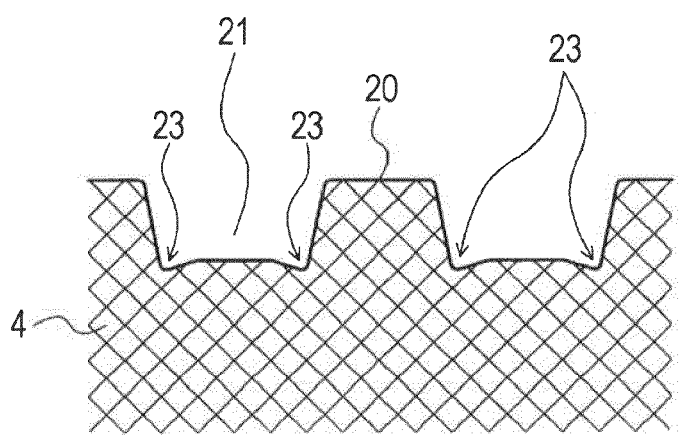

FIG. 4(a) shows the state of the resist layer 2 in the exposure step described above with reference to FIG. 1(a).

When the inorganic resist is exposed to the laser beam L, the inorganic resist swells and expands due to thermochemical reaction. As shown in the figure, the exposed portions 2a swell upward and both ends of the unexposed portions 2b are pulled upward.

Then, when the development step described above with reference to FIG. 1(c) is performed, the exposed portions 2a are formed into the recessed portions 10 and the unexposed portions 2b are formed into the non-recessed portions (projecting portions) 11, as shown in FIG. 4(b).

At this time, both ends of the non-recessed portions 11 (boundaries from the recessed portions 10) remain in the shape in which the ends of the non-recessed portions 11 are pulled upward.

More specifically, the boundaries between the recessed portions 10 and the non-recessed portions 11 include small protrusions 12 which protrude from the flat surfaces of the non-recessed portions 11.

The stamper 4 is formed using the above-described disc master 3. In the stamper 4, the recess-projection pattern on the disc master 3 is transferred in an inverted manner, and the projecting portions 20 and the non-projecting portions (recessed portions) 21 are formed as shown in FIG. 4(c).

In this case, the non-projecting portions 21 have a shape obtained by inverting the shape of the non-recessed portions 11 in the disc master 3, and both ends of the non-projecting portions 21 are formed as depressions corresponding to the small protrusions 12 in the disc master 3.

Thus, in the stamper 4, the boundaries between the projecting portions 20 and the non-projecting portions 21 include small depressions 23 which are formed in the bottom surfaces of the non-projecting portions 21.

As described above with reference to FIGS. 2(a), 2(b), and 2(c), the disc substrate 5 is formed by injection molding using the stamper 4.

Figure 5:
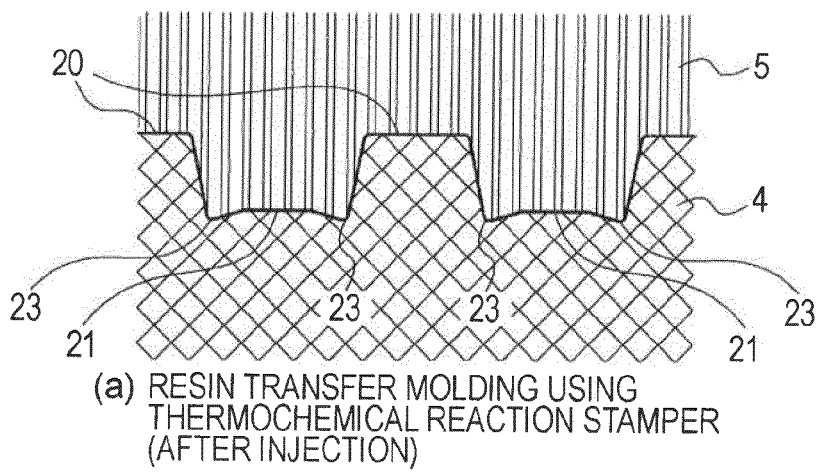
FIG. 5 is a diagram illustrating the small protrusions on the disc substrate according to the embodiment.
Figure 5:
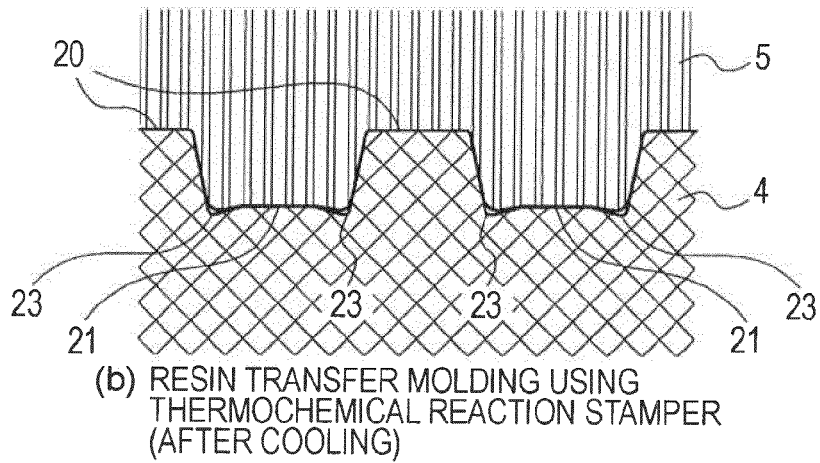
Figure 5:
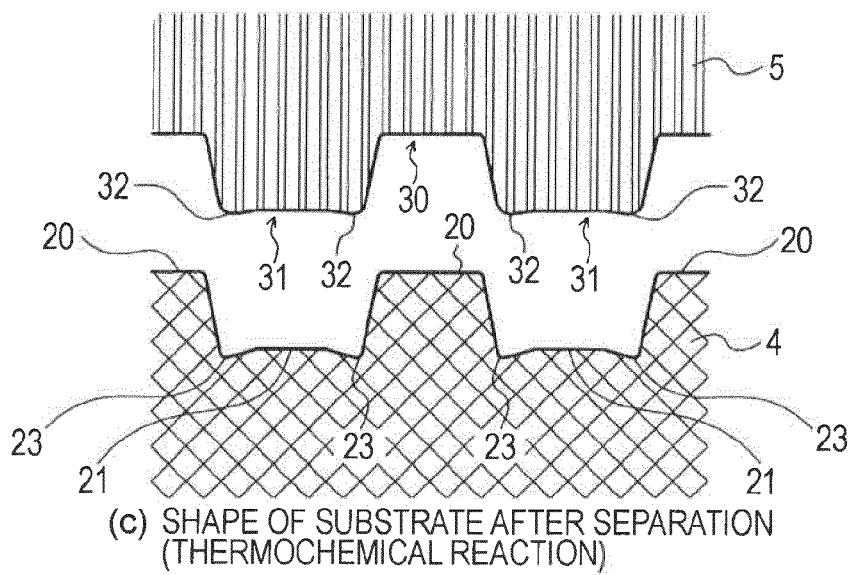

FIG. 5(a) shows the state in which the resin used for forming the disc substrate 5 is injected into a mold in which the stamper 4 is placed. In this state, the resin flows into the small depressions 23.

In this state, the resin is cured by being pressurized and cooled. As a result, some degree of curing contraction occurs, as shown in FIG. 5(b).

Then, as shown in FIG. 5(c), the stamper 4 is removed and the disc substrate 5 is released. In the disc substrate 5, the recess-projection pattern on the stamper is transferred in an inverted manner. In other words, in the disc substrate 5, portions corresponding to the projecting portions 20 in the stamper 4 are formed as the recessed portions 30 and portions corresponding to the non-projecting portions 21 in the stamper 4 are formed as non-recessed portions (projecting portions 31).

Here, the non-projecting portions 21 in the stamper 4 are provided with the small depressions 23. Therefore, although the curing contraction occurs, the shape of the edges of the non-recessed portions 31 in the disc substrate 5 is influenced by the small depressions 23. More specifically, the boundaries between the recessed portions 30 and the non-recessed portions 31 include small protrusions 32 which protrude from the flat surfaces of the non-recessed portions 31.

Figure 6:
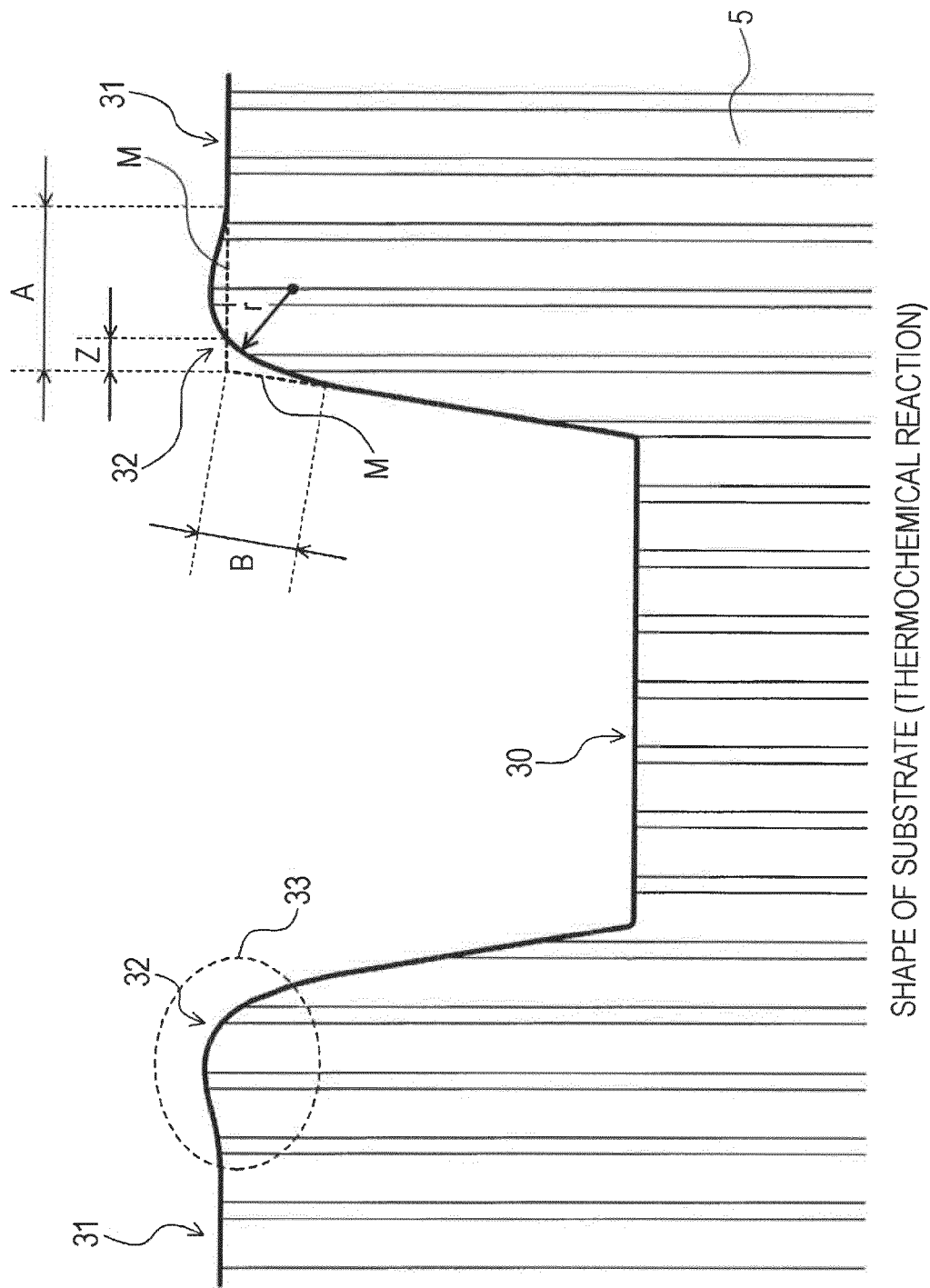
FIG. 6 is a diagram illustrating a pit/land pattern including the small protrusions on the disc substrate according to the embodiment.

FIG. 6 shows the shape of the recessed portions 30 and the non-recessed portions 31 in the disc substrate 5.

In the disc substrate 5, the recessed portions 30 serve as pits and the non-recessed portions 31 serve as lands. As shown in the figure, recess-projection boundaries 33 between the recessed portions 30 and the non-recessed portions (projecting portions) 33 have a curved shape with a relatively large radius of curvature r and include the small protrusions 32 (portions higher than the flat surfaces of the lands).

Here, the ideal shape of the contour in consideration of the pit/land boundaries is the shape shown by the dashed line (M). However, due to the curved shape including the small protrusions 32, there are areas A and B where the actual contour differs from the ideal contour M. In the area A, the actual contour differs from the ideal contour of the land portion. In the area B, the actual contour differs from the ideal inclined pit portion.

The disc substrate 5 of this example can be separated from the stamper 4 with high separation performance, and the quality of the reproduction signal can be ensured.

Degradation of reproduction signal characteristics (jitter) can be prevented for the reason described below.

Figure 10:
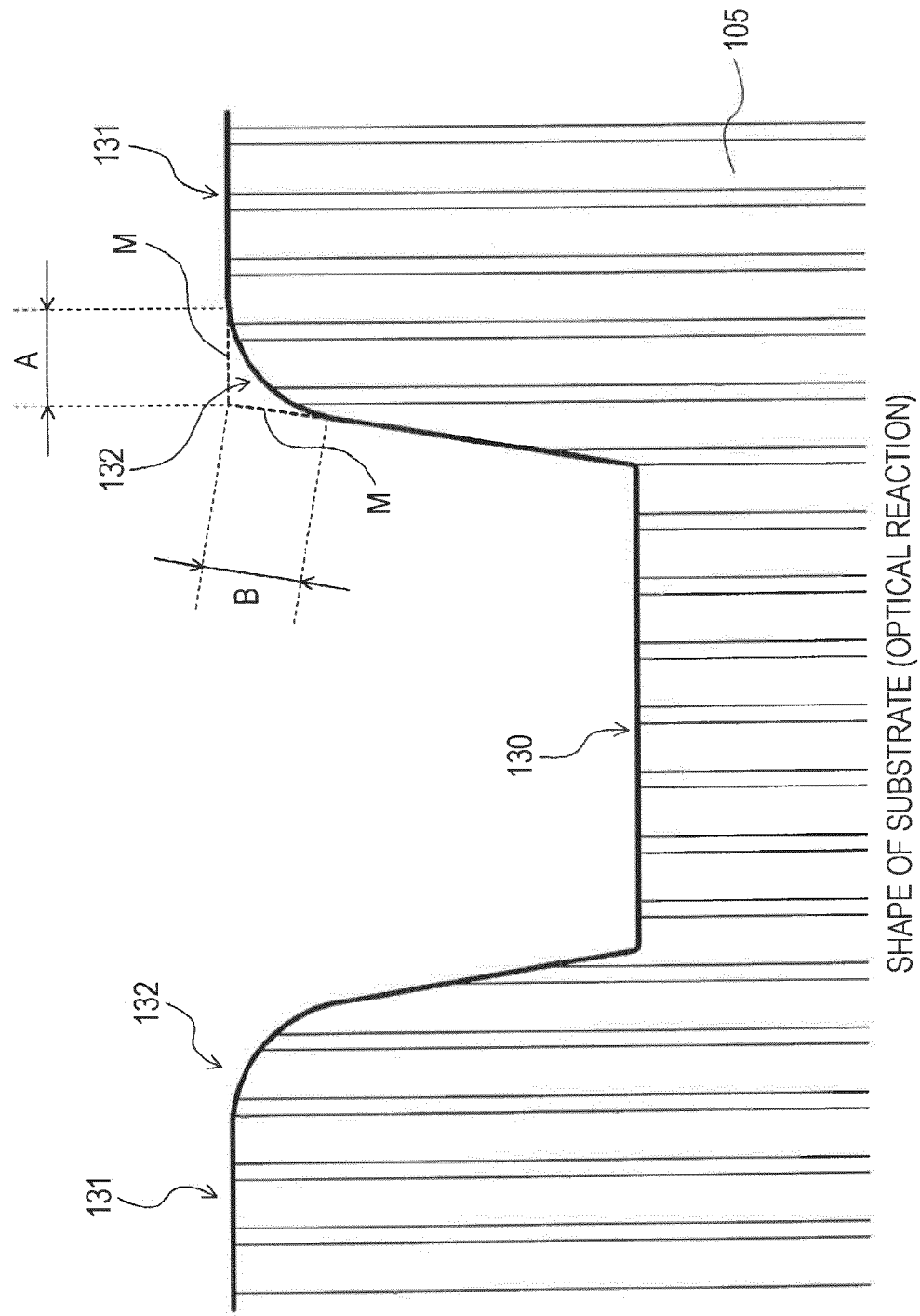
FIG. 10 is a diagram illustrating the pit/land pattern in the case of optical reaction.

That is, in the shape according to the related art shown in FIG. 10, the pit/land boundary in the area A is unclear, and the jitter increases accordingly, as described above.

In the case of the present example shown in FIG. 6, although the actual contour differs from the ideal contour in the area A, the area A is almost entirely covered by the small protrusion 32, which is higher than the flat surfaces of the lands. In the reproduction signal, portions higher than the flat surfaces of the lands are detected as signal components corresponding to the lands.

An area in which the pit/land boundary becomes unclear in the reproduction signal in practice is an area Z, which is on the pit-30 side with respect to the end of the small protrusion 32. In the area Z, the curved portion is lower than the flat surfaces of the lands.

Thus, the area Z in which the pit/land boundary is unclear in the reproduction signal is significantly narrower than that in the case shown in FIG. 10 (area A). This area Z is small enough to maintain the satisfactory signal characteristics in practice.

FIG. 7(a) shows an AFM (atomic force microscope) photograph of the disc substrate 5 of the present example which was actually manufactured. In addition, FIG. 7(b) shows the shape of the disc substrate 5 along the C-D cross section in FIG. 7(a).

As is clear from FIG. 7(b), curved portions having a relatively large radius of curvature including the small protrusions 32 are formed at the pit/land boundaries.

Here, it is difficult to form the above-described disc substrate 5 unless the reaction in the exposure step is the thermochemical reaction.

Figure 7:
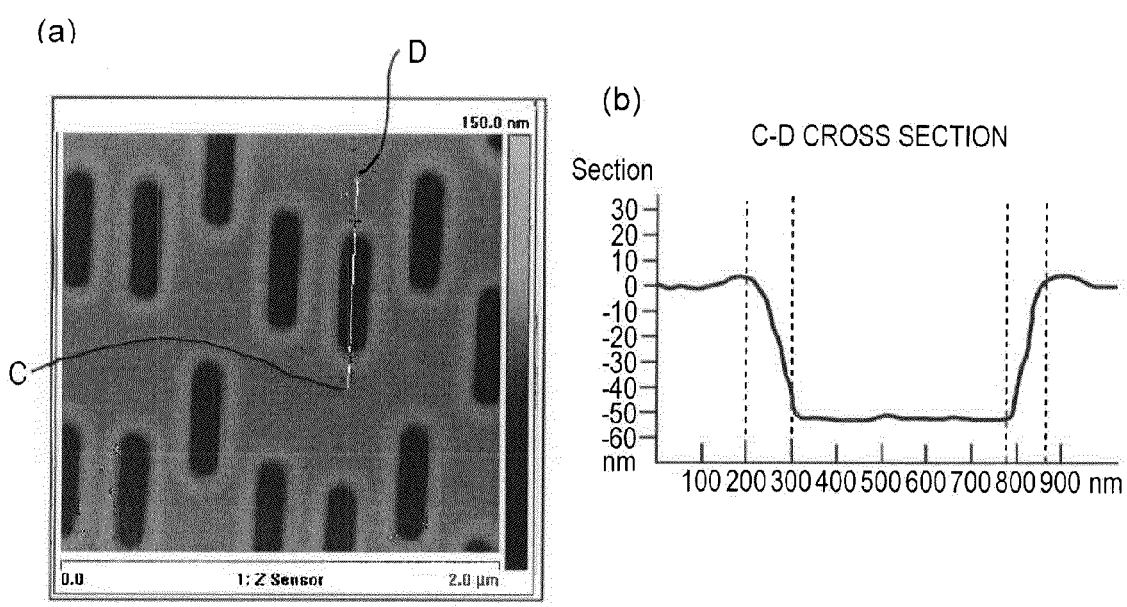
FIG. 7 shows an AFM photograph of the pit/land pattern according to the embodiment and a diagram illustrating the cross-sectional shape of the pit/land pattern.
Figure 8:
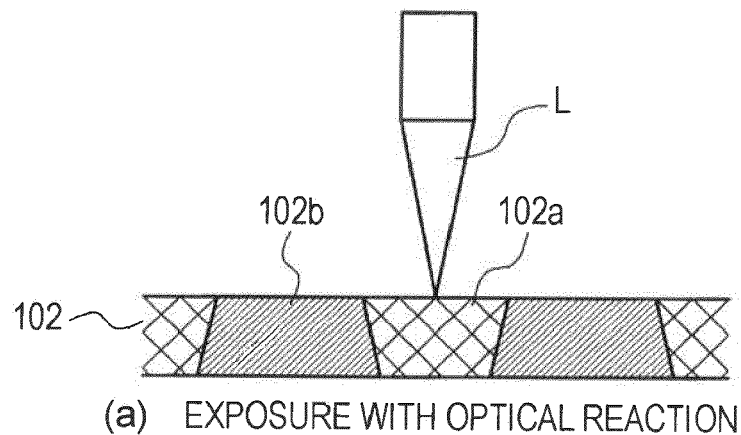
FIG. 8 is a diagram illustrating manufacturing steps in the case of optical reaction.
Figure 8:
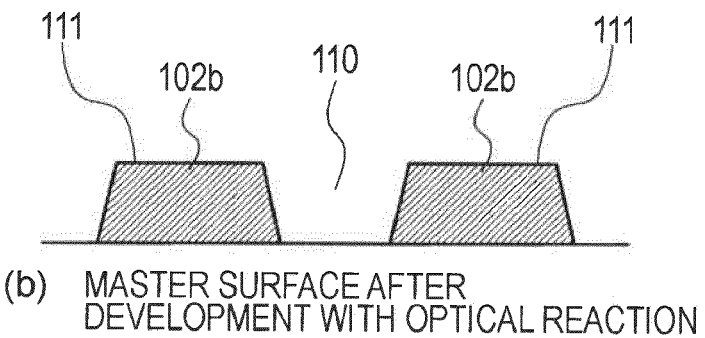
Figure 8:
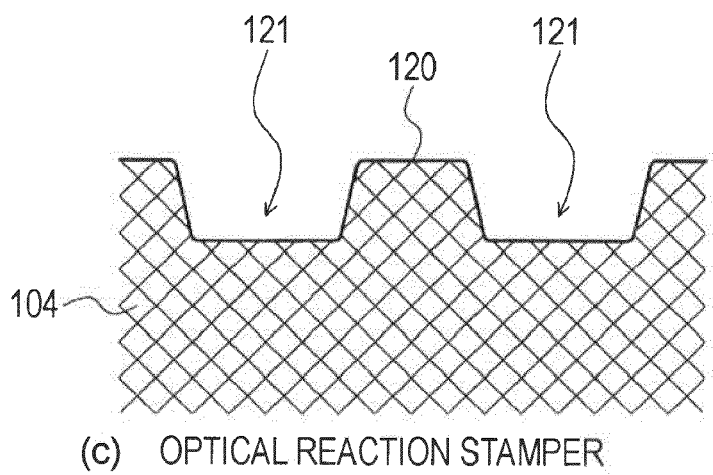
Figure 9:
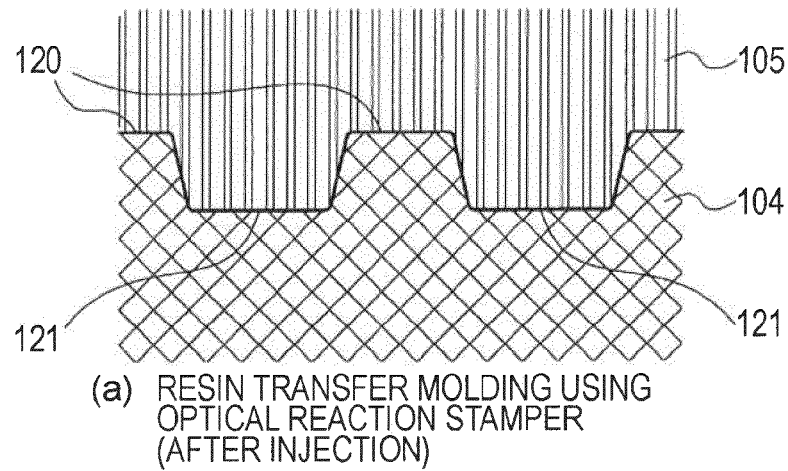
FIG. 9 is a diagram illustrating manufacturing steps in the case of optical reaction.
Figure 9:
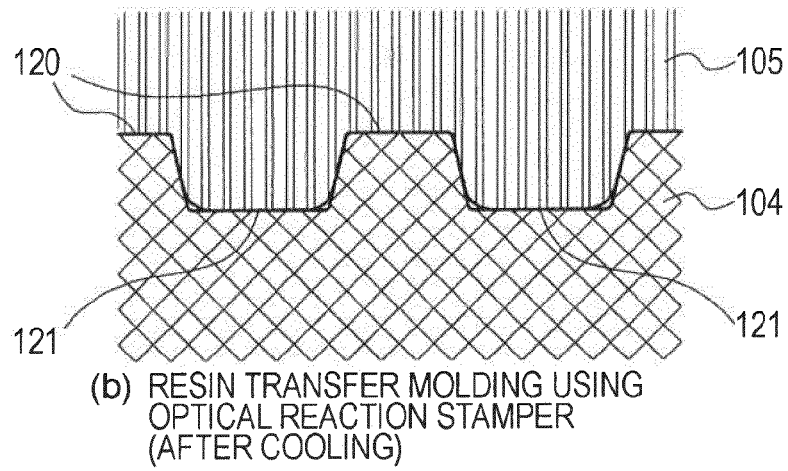
Figure 9:
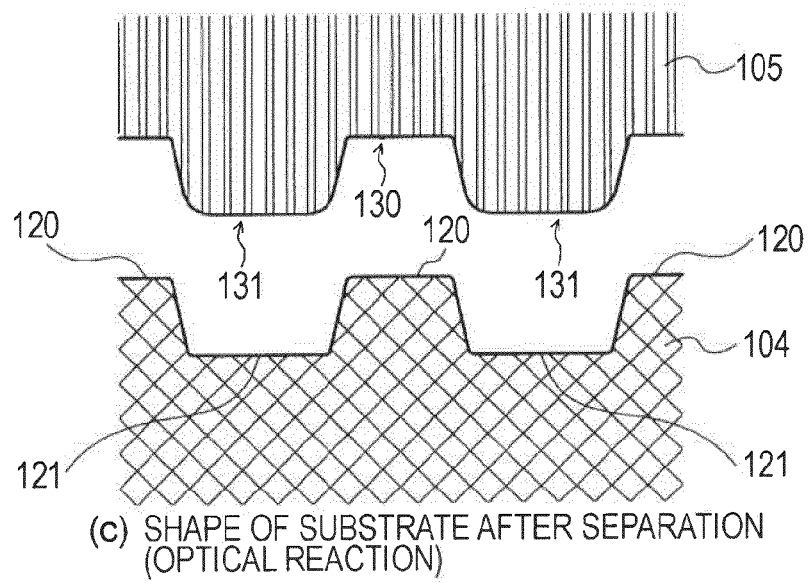

This is because the swelling and expansion of the inorganic resist caused by thermochemical reaction are utilized to form the small protrusions 12 at the recess-projection boundaries in the inorganic resist film 2 which remains on the master substrate 1 made of glass or silicon wafer after the exposure, and the above-described shape shown in FIGS. 6 and 7 is formed by using the protrusions 12.

The above-mentioned swelling and expansion cannot be obtained by optical reaction, and no protrusions remain at the edges of the recess-projection pattern on the resist film after the exposure. If, for example, the shape same as the above-described shape is to be formed by using optical reaction, resist films having different sensitivities to light are stacked and the exposure and development steps are performed for each of the films. This cannot be easily achieved.

In contrast, when the disc master 3 is formed using the thermochemical reaction, the protrusions at the recess-projection boundaries can be used.

In the conventional disc master manufacturing process using the thermochemical reaction, the protrusions at the recess-projection boundaries have not attracted much attention since the height of the protrusions is very small compared to that of the recess-projection pattern on the stamper surface based on which the signal is generated.

Therefore, the exposure conditions and the development conditions in the disc master manufacturing process are determined on the basis of the overall shape of the recess-projection pattern based on which the signal is generated.

As a result, the height of the protrusions at the recess-projection boundaries differs for each disc master, and many stampers that cause transfer failures are produced. Accordingly, the molding conditions are adjusted for each of such stampers to manufacture optical discs that meet the standard, or new stampers are formed under different exposure conditions and development conditions. Therefore, stable supply of the stampers cannot be achieved and it is difficult to increase the yield of the disc manufacturing process.

As a result of consideration of the cause of the above-described situation, it has been found that it is necessary to adjust the height of the protrusions at the recess-projection boundaries. If the height of the small protrusions 12 is too large, when the stamper 4 is manufactured, the depth of the small depressions 23 in the non-projecting portions 21 of the stamper 4 will be too large.

For example, if the height of the small protrusions 12 at the boundaries where the non-recessed portions 11 continue to the recessed portions 10 in the disc master 3 is 10 nm or more with respect to the flat portions (lands) in the top surfaces of the non-recessed portions 11, the height is too large.

If the small protrusions 12 are too high and accordingly the small depressions 23 in the stamper 4 are too deep, a large amount or resin (for example, polycarbonate) flows into the small depressions 23 in the stamper 4 in the process of forming the disc substrate 5. Therefore, the contact area between the stamper 4 and the disc substrate 5 after the contraction due to cooling increases. In addition, the small protrusions 32 formed on the disc substrate 5 serve as obstacles (hitches) when the disc substrate 5 is separated from the stamper 4. Thus, separation failure easily occurs.

Conversely, if the height of the protrusions is considerably small (for example, 1 nm or less), the master becomes similar to that formed by the optical reaction. Therefore, problems similar to those caused by the conventional master will occur.

Here, it has been found that the height of the small protrusions 12 can be adjusted in accordance with the film forming conditions, the exposure conditions, and the development conditions of the inorganic resist layer 2. In the present example, the development time is adjusted such that the height of the protrusions at the boundaries where the non-recessed portions 11 continue to the recessed portions 10 is in the range of 3% to 10% of the height of the non-recessed portions 11 (2 to 7 nm in terms of the measured value) with respect to the flat portions (portions corresponding to lands) in the top surfaces the non-recessed portions 11.

In addition, in view of the effect of releasing the residual stress, the radius of curvature of the small protrusions 12 at the recess-projection boundaries is preferably large.

If the radius of curvature is small (for example, 10 nm or less), similar to the conventional structure, sufficient cooling and pressurization must be performed to release the residual stress in the small protrusions 12 at the recess-projection boundaries.

However, if the radius of curvature is too large, the stamper 4 and the disc substrate 5 are affected accordingly and the difference at the recess-projection boundaries in the disc substrate 5 becomes unclear. Therefore, as described above with reference to FIG. 10, the signal characteristics are degraded. In addition, the overall size of the small protrusions 12 on the disc master 3 will be increased, and the stamper 4 and the disc substrate 5 will be affected accordingly. As a result, the contact area between the stamper 4 and the disc substrate 5 increases and the separation failure occurs.

Accordingly, the development time is adjusted such that the radius of curvature of the small protrusions 12 is in the range of 20% to 60% of the height of the non-recessed portions 11 (20 to 40 nm in terms of the measured value).

The stamper 4 according to the present embodiment can be obtained by forming the stamper 4 using the above-described disc master 3 after the development.

When the disc substrate 5 is formed by injection molding using the stamper 4, the contraction of the resin in the mold due to cooling can be compensated for in accordance with the depth of the small depressions 23 in the stamper 4.

The disc substrate 5 according to the present embodiment can be obtained by forming the disc substrate 5 using the stamper 4. Then, the optical disc according to the present embodiment can be obtained.

In this case, the signal characteristics can be maintained and the separation performance can be improved, as described above.

The mechanism based on which the above effects can be obtained are as follows:
(1) In the injection molding process, a resin substrate is formed by injecting resin into a cavity in a closed mold to which the stamper 4 is attached and pressurizing the resin.
(2) The resin substrate is cooled while the pressurized state is maintained after the injection is completed.
(3) The resin substrate is continuously cooled after the pressurized state is canceled.
(4) When the resin substrate is depressurized and cooled, the resin substrate receives a force in a contracting direction and the shape obtained by transferring the recess-projection pattern changes from the initial shape.
(5) According to the shape of the present embodiment, even when the contraction occurs, the edges between the recesses and projections are prevented from becoming softer. Although the shape changes from the initial recess-projection pattern, clear boundaries can be obtained between the pits and the lands. Therefore, characteristics of the reproduced signals are improved and the signal transferability is improved accordingly. As described above, the signals become closer to the ideal signals as the length of the area Z shown in FIG. 6 is reduced.
(6) It is not necessary to perform the pressurizing and cooling process for a long time to ensure the transferability, and the separation performance is improved. This is because the recess-projection boundaries have a curved shape with a radius of curvature that is suitably large in view of releasing of the residual stress (but not so large as to degrade the signal characteristics).

Here, with regard to the signal characteristics, even if the shapes of the small protrusions 32 on the disc substrate 5 are deformed in the process of forming the substrate, when the signal measurement is finally performed, the size of the area in which the actual shape differs from the ideal shape (M) is smaller than that in the case shown in FIG. 10 in which optical reaction is used.

Hereinafter, an example of actual manufacturing conditions will be described.
<Developer>
An organic alkaline developer containing TMAH (tetramethylammonium hydroxide) as a main component, which is generally used with semiconductors.

<Resist Material>
An inorganic resist containing an incomplete oxide of a transition metal as a main component.
(the transition metal is Ti, V, Cr, Mn, Fe, Nb, Cu, Ni, Co, Mo, Ta, W, Zr, Ru, Ag, etc.)
<Exposure Conditions>
A blue-violet laser beam with a wavelength of 405 nm emitted at an output level of 10 to 15 mW and a linear velocity of about 4.9 m/s (it is assumed that a Blu-ray disc is manufactured and the capacity of the Blu-ray disc is 25 GB (Giga Byte) for each layer).
<Development Conditions>
Development is performed about 10 minutes using the above-mentioned developer.

The disc master 3 was manufactured under the above-described conditions. The height and the radius of curvature of the small protrusions 32 were as described below.

That is, the observed value of the height of the protrusions was 3 to 5 nm.

The rate of the height of the protrusions with respect to the vertical distance (recess-projection vertical interval) between the recessed portions 10 (pit portions) and the non-recessed portions 11 (land portions), which is 70 nm in the case of the Blu-ray disc, is $3/70$ to $5/70$. Thus, the height of the protrusions is 4% to 7% of the pit/land vertical interval.

In the case of the DVD (Digital Versatile Disc), the recess-projection vertical interval is 120 to 130 nm. Therefore, the rate of the height of the protrusions is $3/130$ to $5/120$ (2% to 4% with respect to the vertical interval).

The observed value of the radius of curvature was 20 to 40 nm.

In the case of the Blu-ray disc, the rate of the radius of curvature with respect to the recess-projection vertical interval, which is 70 nm, is $20/70$ to $40/70$ (29% to 57% with respect to the vertical interval), that is, 30% to 60%.

In the case of the DVD, the rate of the radius of curvature with respect to the recess-projection vertical interval, which is 120 to 130 nm, is $20/130$ to $40/120$ (15% to 33% with respect to the vertical interval), that is, 15% to 35%.

The height and the radius of curvature of the small protrusions 12 affect the depth and the radius of curvature of the small depressions 23 in the stamper 4.

Then, the depth and the radius of curvature of the small protrusions 32 on the disc substrate 5 are substantially similarly affected. In the case of the Blu-ray disc, the height of the small protrusions 32 shown in FIG. 6 is 4% to 7% of the pit/land height, and the radius of curvature thereof is 30% to 60% of the pit/land height.

Thus, in these cases, the contraction of the substrate due to cooling of the resin in the molding process can be compensated for, and the cooling time can be reduced. Thus, both the transferability and the separation performance can be ensured.

Here, in the above embodiment, a case in which a reproduction-only disc is manufactured and the recess-projection pattern corresponds to pits and lands has been described. However, the present invention can also be applied to the case in which a recordable disc is manufactured, that is, to the case in which the recess-projection pattern corresponds to grooves and lands, or to the case in which a recess-projection transferring process for multi-layered holograms is performed. In addition, the present invention can also be applied in the process of forming fine shapes on a surface.

The invention claimed is:
1. An optical disc manufactured by the steps of manufacturing a stamper using a disc master having a recessed portion formed therein, the stamper having a projecting portion formed by transferring the recessed portion; manufacturing a disc substrate using the stamper, the disc substrate having a recessed portion formed by transferring the projecting portion in the stamper; and forming a predetermined layered structure on the disc substrate, the optical disc comprising:

a boundary portion between the recessed portion and a non-recessed portion formed in the disc substrate that includes a small protrusion which protrudes from a flat surface of the non-recessed portion, wherein a height of the small protrusion from the flat surface of the non-recessed portion is in the range of 3% to 10% of a height of the flat surface of the non-recessed portion from the recessed portion, and a radius of curvature of the small protrusion is in the range of 20% to 60% of the height of the flat surface of the non-recessed portion from the recessed portion.

2. A disc substrate manufactured using a stamper, the stamper being manufactured using a disc master having a recessed portion formed therein, the stamper having a projecting portion formed by transferring the recessed portion, the disc substrate having a recessed portion formed by transferring the projecting portion in the stamper, wherein the stamper used for manufacturing the disc substrate is a stamper in which a boundary portion between the projecting portion and a non-projecting portion includes a small depression which is formed in a bottom surface of the non-projecting portion.

3. An optical disc manufactured by the steps of manufacturing a stamper using a disc master having a recessed portion formed therein, the stamper having a projecting portion formed by transferring the recessed portion;

manufacturing a disc substrate using the stamper, the disc substrate having a recessed portion formed by transferring the projecting portion in the stamper; and forming a predetermined layered structure on the disc substrate, wherein the stamper used for manufacturing the disc substrate is a stamper in which a boundary portion between the projecting portion and a non-projecting portion includes a small depression which is formed in a bottom surface of the non-projecting portion, and the predetermined layered structure is formed on the disc substrate.

4. A disc master for use in a manufacturing process for manufacturing an optical disc, the manufacturing process including the steps of manufacturing a stamper using the disc master, the disc master having a recessed portion formed therein, the stamper having a projecting portion formed by transferring the recessed portion; manufacturing a disc substrate using the stamper, the disc substrate having a recessed portion formed by transferring the projecting portion in the stamper; and forming a predetermined layered structure on the disc substrate, wherein an exposed portion of the disc master is formed by thermochemical reaction caused by exposing an inorganic resist film provided on a master substrate to a laser beam and a development process is performed so that the exposed portion is formed into the recessed portion, a boundary portion between the recessed portion and a non-recessed portion includes a small protrusion which protrudes from a flat surface of the non-recessed portion, a height of the small protrusion from the flat surface of the non-recessed portion is in the range of 3% to 10% of a height of the flat surface of the non-recessed portion from the recessed portion, and a radius of curvature of the small protrusion is in the range of 20% to 60% of the height of the flat surface of the non-recessed portion from the recessed portion.

5. A disc substrate manufactured using a stamper, the stamper being manufactured using a disc master having a recessed portion formed therein, the stamper having a projecting portion formed by transferring the recessed portion, the disc substrate comprising:

a recessed portion formed by transferring the projecting portion in the stamper; and a boundary portion between the recessed portion and a non-recessed portion that includes a small protrusion which protrudes from a flat surface of the non-recessed portion, wherein a height of the small protrusion from the flat surface of the non-recessed portion is in the range of 3% to 10% of a height of the flat surface of the non-recessed portion from the recessed portion, and a radius of curvature of the small protrusion is in the range of 20% to 60% of the height of the flat surface of the non-recessed portion from the recessed portion.

6. A stamper for use in a manufacturing process for manufacturing an optical disc, the manufacturing process including the steps of manufacturing the stamper using a disc master having a recessed portion formed therein, the stamper having a projecting portion formed by transferring the recessed portion;

manufacturing a disc substrate using the stamper, the disc substrate having a recessed portion formed by transferring the projecting portion in the stamper; and forming a predetermined layered structure on the disc substrate, wherein the stamper includes a boundary portion between the projecting portion and a non-projecting portion having a small depression which is formed in a bottom surface of the non-projecting portion.

7. A disc master manufacturing method for manufacturing a disc master for use in a manufacturing process for manufacturing an optical disc, the manufacturing process including the steps of manufacturing a stamper using the disc master, the disc master having a recessed portion formed therein, the stamper having a projecting portion formed by transferring the recessed portion; manufacturing a disc substrate using the stamper, the disc substrate having a recessed portion formed by transferring the projecting portion in the stamper; and forming a predetermined layered structure on the disc substrate, the disc master manufacturing method comprising:

forming an inorganic resist film on a master substrate;

forming an exposed portion by thermochemical reaction by exposing the inorganic resist film on the master substrate to a laser beam; and performing a deposition process for the master substrate on which the exposed portion is formed for a predetermined time, so that the exposed portion is formed into the recessed portion and a small protrusion which protrudes from a flat surface of a non-recessed portion is formed in a boundary portion between the recessed portion and the non-recessed portion, wherein an inorganic resist material for forming the inorganic resist film, power of the laser beam, and the time for which the development process is performed are set such that a height of the small protrusion from the flat surface of the non-recessed portion is in the range of 3% to 10% of a height of the flat surface of the non-recessed portion from the recessed portion and a radius of curvature of the small protrusion is in the range of 20% to 60% of the height of the flat surface of the non-recessed portion from the recessed portion.

8. An optical disc manufacturing method, comprising:

forming an inorganic resist film on a master substrate;

forming an exposed portion by thermochemical reaction by exposing the inorganic resist film on the master substrate to a laser beam;

forming a disc master by performing a deposition process for the master substrate on which the exposed portion is formed for a predetermined time so that the exposed portion is formed into the recessed portion and a small protrusion which protrudes from a flat surface of a non-recessed portion is formed in a boundary portion between the recessed portion and the non-recessed portion;

forming a stamper using the disc master, the stamper having a projecting portion formed by transferring the recessed portion in the disc master;

forming a disc substrate using the stamper, the disc substrate having a recessed portion formed by transferring the projecting portion in the stamper; and forming an optical disc by forming a predetermined layered structure on the disc.

\* \* \* \* \*